(12) United States Patent
Hoeber et al.

(10) Patent No.: US 7,809,717 B1
(45) Date of Patent: Oct. 5, 2010

(54) METHOD AND APPARATUS FOR CONCEPT-BASED VISUAL PRESENTATION OF SEARCH RESULTS

(75) Inventors: Orland Hoeber, Regina (CA); Xue-Dong Yang, Regina (CA); Yiyu Yao, Regina (CA)

(73) Assignee: University of Regina, Regina, Saskatchawan (CA)

( * ) Notice: Subject to any disclaimer, the term of this patent is extended or adjusted under 35 U.S.C. 154(b) by 514 days.

(21) Appl. No.: 11/526,409

(22) Filed: Sep. 25, 2006

(30) Foreign Application Priority Data

Jun. 6, 2006 (CA) .................................. 2549536

(51) Int. Cl.
*G06F 7/00* (2006.01)
*G06F 17/30* (2006.01)

(52) U.S. Cl. .................. 707/722; 707/728; 707/731; 707/749

(58) Field of Classification Search ........ None
See application file for complete search history.

(56) References Cited

U.S. PATENT DOCUMENTS

| | | | |
|---|---|---|---|
| 5,634,051 A * | 5/1997 | Thomson | 707/5 |
| 5,768,578 A | 6/1998 | Kirk et al. | |
| 6,038,560 A | 3/2000 | Wical | |
| 6,070,176 A | 5/2000 | Downs et al. | |
| 6,363,377 B1 | 3/2002 | Kravets et al. | |
| 6,523,026 B1 * | 2/2003 | Gillis | 707/3 |
| 6,675,159 B1 * | 1/2004 | Lin et al. | 1/1 |
| 6,711,585 B1 * | 3/2004 | Copperman et al. | 707/104.1 |
| 6,721,729 B2 * | 4/2004 | Nguyen et al. | 707/3 |
| 6,742,003 B2 | 5/2004 | Heckerman et al. | |
| 6,847,966 B1 * | 1/2005 | Sommer et al. | 1/1 |
| 6,895,406 B2 | 5/2005 | Fables et al. | |

(Continued)

FOREIGN PATENT DOCUMENTS

GB 2338324 12/1999

(Continued)

OTHER PUBLICATIONS

Pu, "Online Information Review", vol. 29, 2005.

(Continued)

*Primary Examiner*—Mohammad Ali
*Assistant Examiner*—Angelica Ruiz
(74) *Attorney, Agent, or Firm*—Patterson, Thuente, Christensen, Pedersen, P.A.

(57) ABSTRACT

A method and apparatus is provided for visually coding or sorting search results based on the similarity of the search results to one or more concepts. A search query containing search terms is used to conduct a web search and obtain search results comprising a number of document surrogates describing the located web pages. Concepts are obtained using the search terms and the similarities between the obtained concepts and the search results are evaluated. The search results are then displayed in a manner that indicates the relative similarity of search results to one or more of the determined concepts, such as by sorting the search results based on the level of similarity of the search results to one or more concepts or by providing an accordance indicator with each displayed search result, the accordance indicators indicating the similarity of the corresponding search result with one or more of the concepts.

30 Claims, 12 Drawing Sheets

U.S. PATENT DOCUMENTS

| | | | |
|---|---|---|---|
| 7,113,960 B2 * | 9/2006 | Goldfuss et al. | 1/1 |
| 7,181,438 B1 * | 2/2007 | Szabo | 707/2 |
| 7,249,117 B2 * | 7/2007 | Estes | 706/52 |
| 7,296,021 B2 * | 11/2007 | Malkin et al. | 707/7 |
| 7,401,087 B2 * | 7/2008 | Copperman et al. | 707/101 |
| 2002/0023077 A1 * | 2/2002 | Nguyen et al. | 707/1 |
| 2002/0042793 A1 * | 4/2002 | Choi | 707/6 |
| 2002/0052894 A1 | 5/2002 | Bourdoncle et al. | |
| 2002/0107840 A1 | 8/2002 | Rishe | |
| 2003/0177111 A1 * | 9/2003 | Egendorf et al. | 707/3 |
| 2004/0122656 A1 * | 6/2004 | Abir | 704/4 |
| 2004/0215599 A1 | 10/2004 | Apps | |
| 2004/0220944 A1 | 11/2004 | Behrens et al. | |
| 2004/0267774 A1 * | 12/2004 | Lin et al. | 707/100 |
| 2005/0165766 A1 * | 7/2005 | Szabo | 707/3 |
| 2006/0047663 A1 * | 3/2006 | Rail | 707/10 |
| 2006/0074859 A1 * | 4/2006 | Gange et al. | 707/3 |
| 2006/0167930 A1 * | 7/2006 | Witwer et al. | 707/102 |
| 2006/0184521 A1 * | 8/2006 | Ponte | 707/5 |
| 2006/0259481 A1 * | 11/2006 | Handley | 707/5 |
| 2006/0265388 A1 * | 11/2006 | Woelfel | 707/10 |
| 2006/0288023 A1 * | 12/2006 | Szabo | 707/100 |
| 2007/0073533 A1 * | 3/2007 | Thione et al. | 704/9 |
| 2007/0073748 A1 * | 3/2007 | Barney | 707/101 |
| 2007/0078848 A1 * | 4/2007 | Sareen et al. | 707/5 |
| 2007/0203693 A1 * | 8/2007 | Estes | 704/9 |
| 2007/0214131 A1 * | 9/2007 | Cucerzan et al. | 707/5 |
| 2007/0214154 A1 * | 9/2007 | Ducatel et al. | 707/100 |
| 2007/0244859 A1 * | 10/2007 | Trippe et al. | 707/3 |
| 2008/0140616 A1 * | 6/2008 | Encina et al. | 707/3 |

FOREIGN PATENT DOCUMENTS

| | | |
|---|---|---|
| WO | WO0177883 | 10/2001 |
| WO | WO0248921 | 6/2002 |

OTHER PUBLICATIONS

Velez and Valiente, "Proceedings of the IASTED International Conference Internet and Multimedia Systems Applications", 2001. Applicant has been unable to locate a copy of this reference but upon receipt, will supply a copy to the Examiner.

Lee, "Compu Educ", vol. 44, May 2005. Applicant has been unable to locate a copy of this reference but upon receipt, will supply a copy to the Examiner.

Hoeber, Xue-Dong, Yifu, "Proceedings. The 2005 IEEE/WIC/ACM International Conference on Web Intelligence", 2005.

Granitzer, Kienreich, Sabol, Dosinger, "Proceedings of the Twelfth IEEE International Workshop on Enabling Technologies: Infrastructure for Collaborative Enterprises", 2003.

* cited by examiner

METHOD AND APPARATUS FOR CONCEPT-BASED VISUAL PRESENTATION OF SEARCH RESULTS

RELATED APPLICATION

The present application claims the benefit of Canadian Patent Application Serial No. 2,549,536 filed Jun. 6, 2006, which is incorporated herein in its entirety by reference.

BACKGROUND

The World Wide Web has given computer users on the Internet access to vast amounts of information in the form of billions of Web pages. Each of these pages can be accessed directly by a user typing the URL (universal resource locator) of a web page into a web browser on the user's computer, but often, a person is more likely to access a website by finding it with the use of search engine. A search engine allows a user to input a search query made up of words or terms that a user thinks will be used in the web pages containing the information he or she is looking for. The search engine will attempt to match web pages to the terms in the search query and will then return the located web pages to the user.

The search results generated from a user's query typically consist of a collection of document surrogates, each of which contains summary information, attributes, and other metadata about the matched documents. These documents surrogates are often presented in a simple list-based format, displaying the title of the document, a snippet containing the query terms in context, and the uniform resource locator (the URL). A user can then select one of the returned entries to view the corresponding web page.

With the continued growth of web pages available on the Internet making the task of search engines more and more difficult, web search engines have greatly increased the size of their indexes and made significant advances in the algorithms used to match a user's query to these indexes. However, while it is clear that significant effort has gone into creating web search engines that can index billion of documents and return the search results in a fraction of a second, this has resulted in the creation of the problem of search queries returning numerous results.

While relevant documents might be present in the search results returned from a search engine, often the returned search results consist of tens or hundreds of individual documents making it hard for a user to determine which of the search results may or may not be relevant to the information the user is looking for.

While information retrieval techniques used by web search engines have improved substantially over the years, the search results are still typically represented in a simple list-based format. Although this list-based representation makes it easy to evaluate a single document, it does not support the users in the broader tasks of manipulating the search results, comparing documents, or finding a set of relevant documents. Even though this simple list-based representation provides the search results in a clear and effective manner for determining the relevance of individual document surrogates, it requires that each document surrogate be evaluated in turn, and to some degree, in the order provided. If hundreds of documents are returned it is inefficient if not completely impractical to have a user review hundreds of results to determine the most relevant documents located in the search. Requiring users to evaluate each document surrogate individually, often with only ten documents per page, leads to a common user search trait of evaluating only a few pages of search results before either re-formulating their query or giving up.

One solution that can be used to address these numerous search results is for the user to reformulate his or her search query to narrow the search with the result that fewer document are located matching the search query, however, in many cases there may be high quality relevant documents buried in the search results set that were missed because the users did not look at enough search result pages.

Another method that has also been used is to cluster the search results such that documents that are similar to one another are grouped together. In such a system, a user navigates the clusters in order to narrow down the search results and avoid clusters of irrelevant documents. Ideally, the user will select the relevant clusters and view lists of the returned documents in which a large portion are relevant to the requirements of the user.

One of the problems with these systems is that determining what the clusters should be centered around and determining an adequate description of the cluster. If the information does not correctly describe the document contained in the cluster, a user may either choose clusters that are not relevant or entirely miss clusters that may contain relevant documents.

SUMMARY OF THE INVENTION

It is an object of the present invention to provide a system and method that overcomes problems in the prior art.

In a first aspect of the invention, a method is provided for visually coding search results based on at least one concept. The method comprises: using a search query containing a plurality of search terms to conduct a search of a plurality of computer readable documents and obtain the search results, the search results comprising at least one returned documents; obtaining the at least one concept by matching the plurality of search terms to the at least one concept; evaluating the similarity between the at least one returned document and the at least one concept; and displaying the at least one returned document with an accordance indicator. The accordance indicator indicates the similarity between the at least one returned document and the at least one concept.

In a second aspect of the invention, a data processing system for visually coding search results based on at least one concept. The data processing system comprises: at least one processor, a memory operatively coupled to the at least one processor; a display device operative to display data; and a program module stored in the memory and operative for providing instructions to the at least one processor. The at least one processor is responsive to the instructions of the program module. The program module operative is for, using a search query containing at least one search term to conduct a search of a plurality of computer readable documents and obtain search results comprising a plurality of returned documents; obtaining the least one concept by matching the at least one search term to the at least one concept; evaluating the similarity between a returned document and the at least one concept; and displaying on the display device the returned document with an accordance indicator. The accordance indicator indicates the similarity between the returned document and the at least one concept.

In a third aspect of the invention, a method of visually sorting search results based on at least one concept is provided. The method comprises: using a search query containing a plurality of search terms to conduct a search of a plurality of computer readable documents and obtain the search results, the search results comprising a first returned document and a second returned document; obtaining the least one concept by matching the plurality of search terms to the at least one concept; determining a first accordance value by evaluating the similarity between the first returned document and the at least one concept and a second accordance value by evaluating the similarity between the second returned document and the at least one concept; and displaying the first returned document and second returned document sorted in an order based on the first accordance value and the second accordance value.

In a fourth aspect of the invention, a data processing system for visually sorting search results based on at least one concept. The data processing system comprises: at (east one processor, a memory operatively coupled to the at least one processor, a display device operative to display data; and a program module stored in the memory and operative for providing instructions to the at least one processor. The at least one processor is responsive to the instructions of the program module. The program module operative is for using a search query containing a plurality of search terms to conduct a search of a plurality of computer readable documents and obtain the search results, the search results comprising a first returned document and a second returned document; obtaining the least one concept by matching the plurality of search terms to the at least one concept; determining a first accordance value by evaluating the similarity between the first returned document and the at least one concept and a second accordance value by evaluating the similarity between the second returned document and the at least one concept, and displaying the first returned document and second returned document sorted in an order based on the first accordance value and the second accordance value.

In a further aspect of the invention, a computer readable memory having recorded thereon statements and instructions for execution by a computer to carry out the above methods is provided.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Data Processing System

Figure 1:
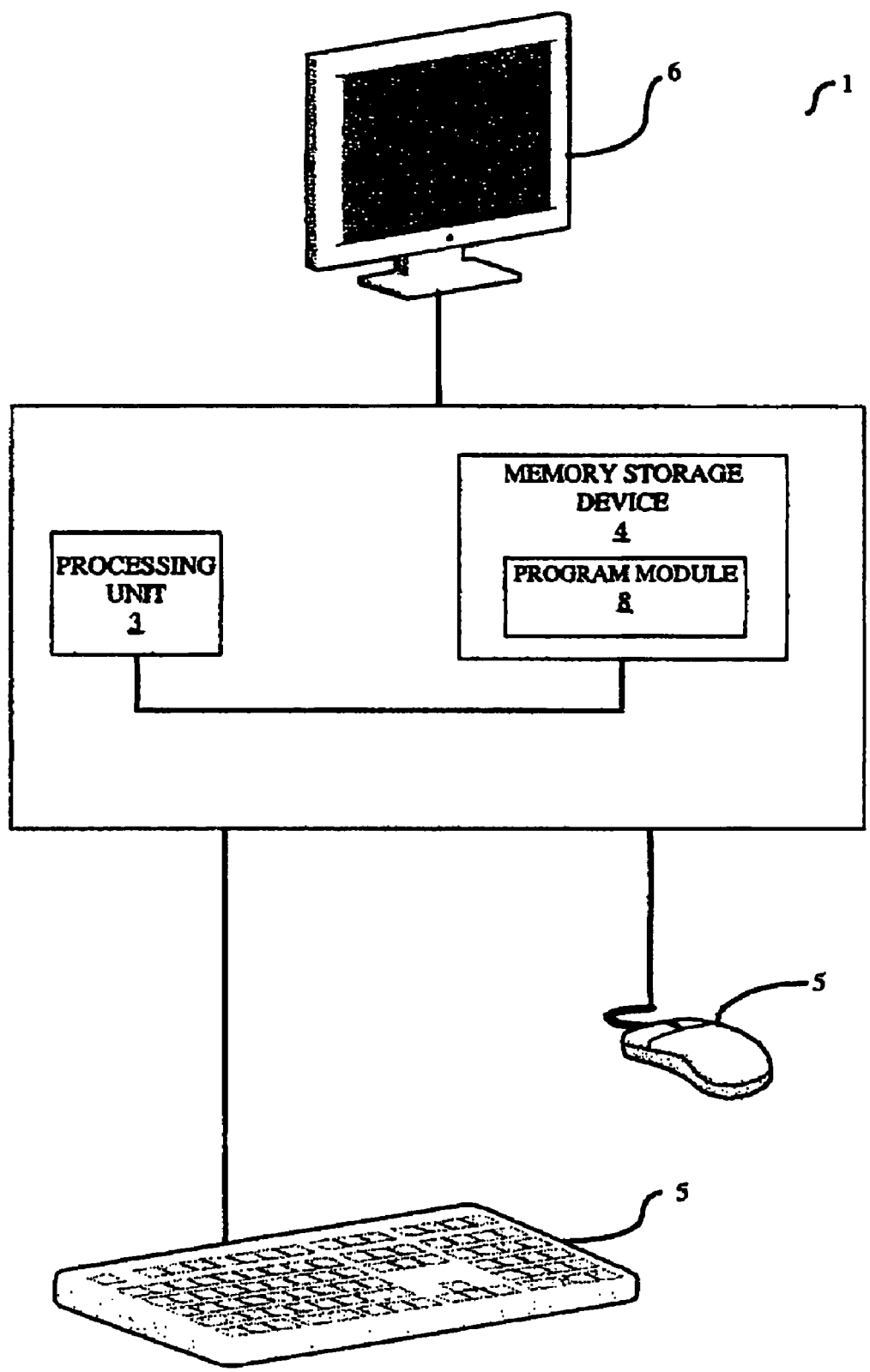
FIG. 1 is a schematic illustration of a data processing system suitable for supporting the operation of methods in accordance with the present invention.

FIG. 1 illustrates a data processing system 1 suitable for supporting the operation of methods in accordance with the present invention. The data processing system 1 could be a personal computer, server, mobile computing device, cell phone, etc. The data processing system 1 typically comprises: at least one processing unit 3; a memory storage device 4; at least one input device 5; a display device 6 and a program module 8.

The processing unit 3 can be any processor that is typically known in the art with the capacity to run the program and is operatively coupled to the memory storage device 4 through a system bus. In some circumstances the data processing system 1 may contain more than one processing unit 3.

The memory storage device 4 is operative to store data and can be any storage device that is known in the art, such as a local hard-disk, etc. and can include local memory employed during actual execution of the program code, bulk storage, and cache memories for providing temporary storage. Additionally, the memory storage device 4 can be a database that is external to the data processing system 1 but operatively coupled to the data processing system 1.

The input device 5 can be any suitable device suitable for inputting data into the data processing system 1, such as a keyboard, mouse or data port, such as a network connection, and is operatively coupled to the processing unit 3 and allowing the processing unit 3 to receive information from the input device 5.

The display device 6 is a CRT, LCD monitor, etc. operatively coupled to the data processing system 1 and operative to display information. The display device 6 could be a stand-alone screen or if the data processing system 1 is a mobile device, the display device 6 could be integrated into a casing containing the processing unit 3 and the memory storage device 4.

The program module 8 is stored in the memory storage device 4 and operative to provide instructions to processing unit 3 and the processing unit 3 is responsive to the instructions from the program module 8.

Although other internal components of the data processing system 1 are not illustrated, it will be understood by those of ordinary skill in the art that only the components of the data processing system 1 necessary for an understanding of the present invention are illustrated and that many more components and interconnections between them are well known and can be used.

Figure 2A:
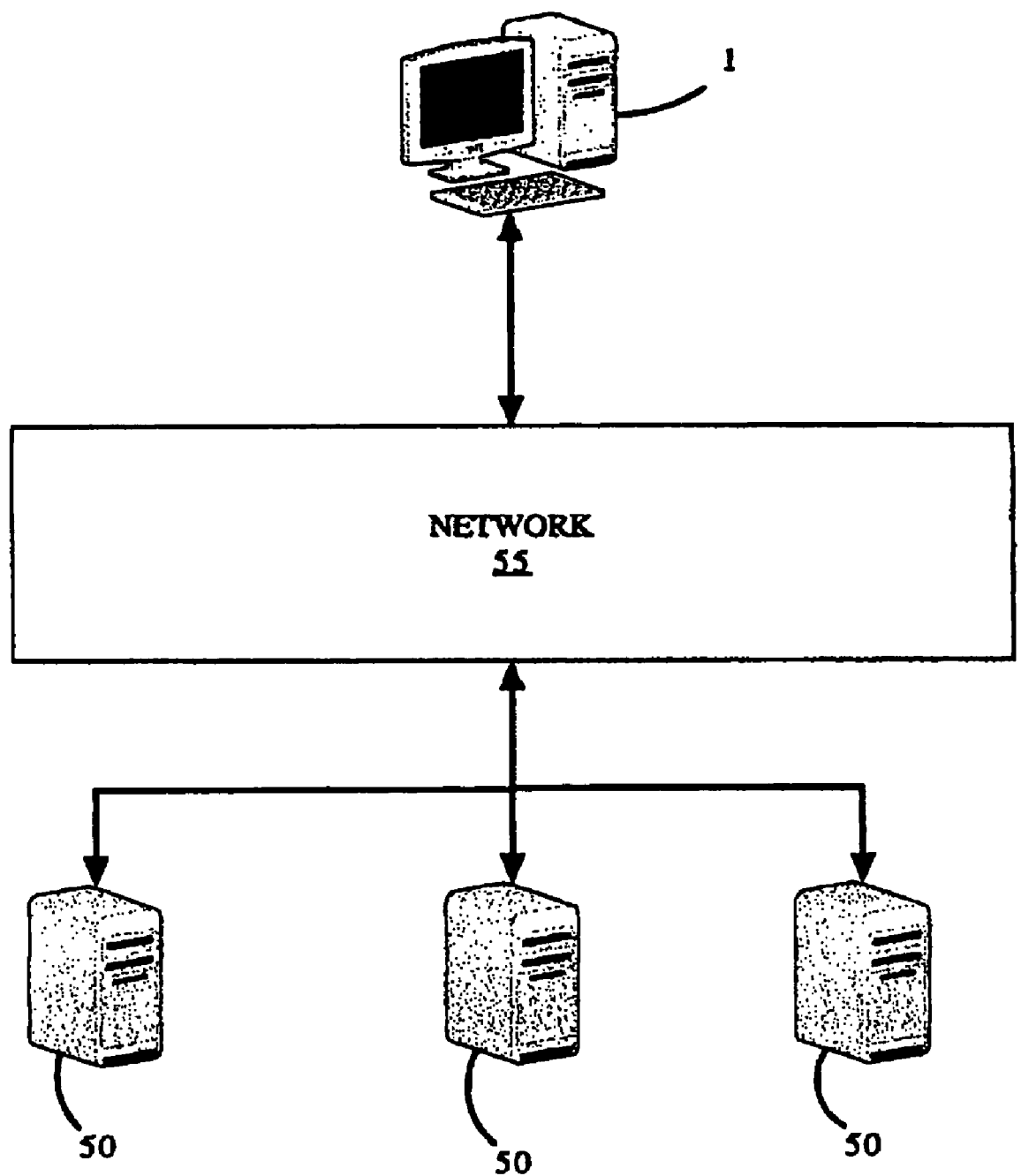
FIG. 2A is a schematic illustration of a network configuration suitable for supporting the operation of methods in accordance with the present invention wherein the data processing system is connected over a network to a plurality of servers operating as a search engine.
Figure 2B:
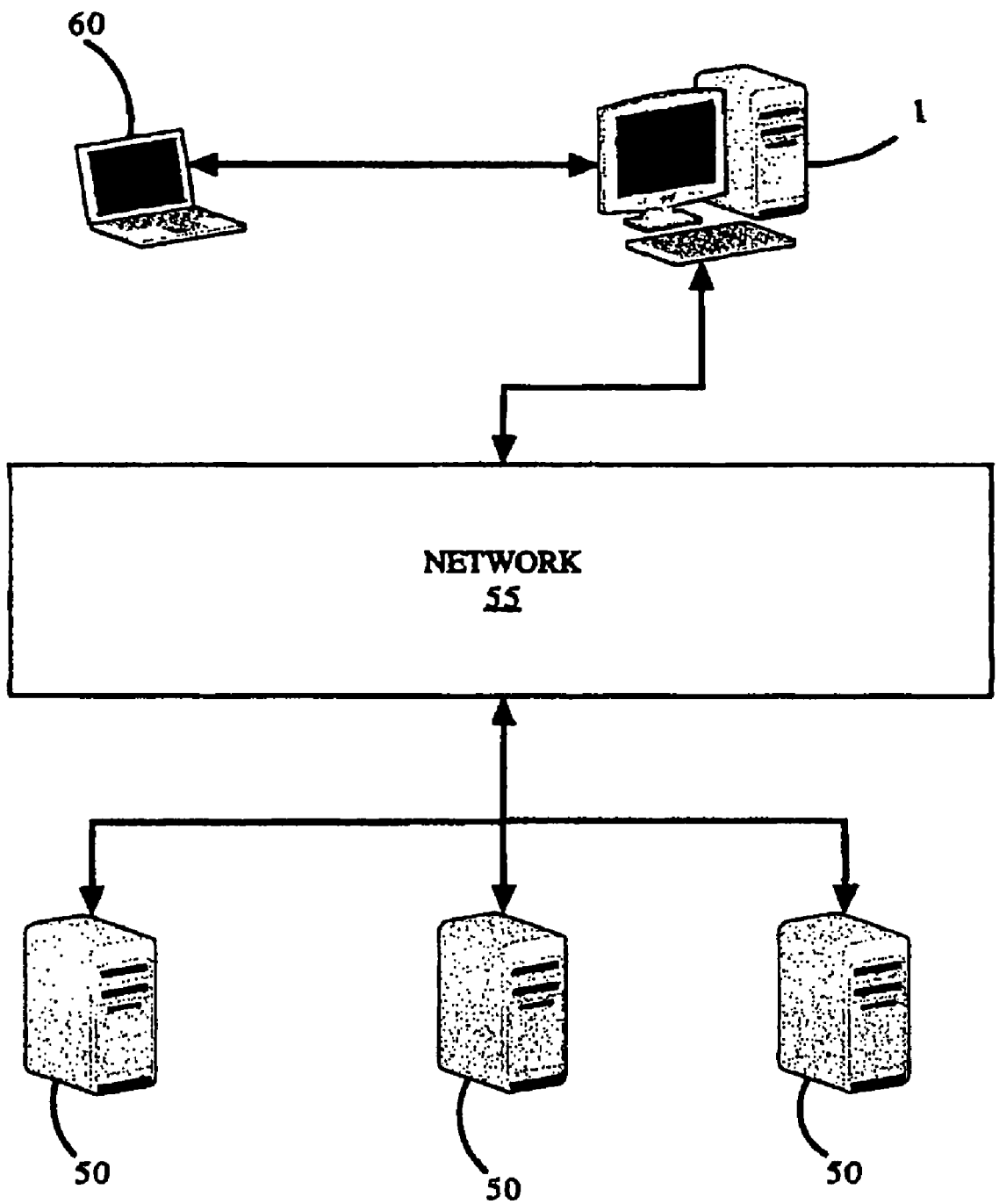
FIG. 2B is a schematic illustration of a network configuration suitable for supporting the operation of methods in accordance with the present invention wherein the data processing system is configured as a server and a remote device is used to access the data processing system.

FIG. 2A illustrates a network configuration wherein the data processing system 1 is connected over a network 55 to a plurality of servers 50 operating as a search engine. FIG. 2B illustrates a network configuration wherein the data processing system 1 is configured as a server and a remote device 60, such as another computer, a FDA, cell phone or other mobile device connected to the Internet, is used to access the data processing system 1. The data processing system 1 runs the majority of the software and methods, in accordance with the present invention, and accesses a plurality of servers 50 operating as a search engine to conduct a web search. By having the data processing system 1 configured as a server, the remote device 60 does not need to have the capacity necessary to contain all the necessary data structures and run all the methods.

Furthermore, the invention can take the form of a computer readable medium having recorded thereon statements and instructions for execution by a data processing system 1. For the purposes of this description, a computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Concept Knowledge Base

Figure 3:
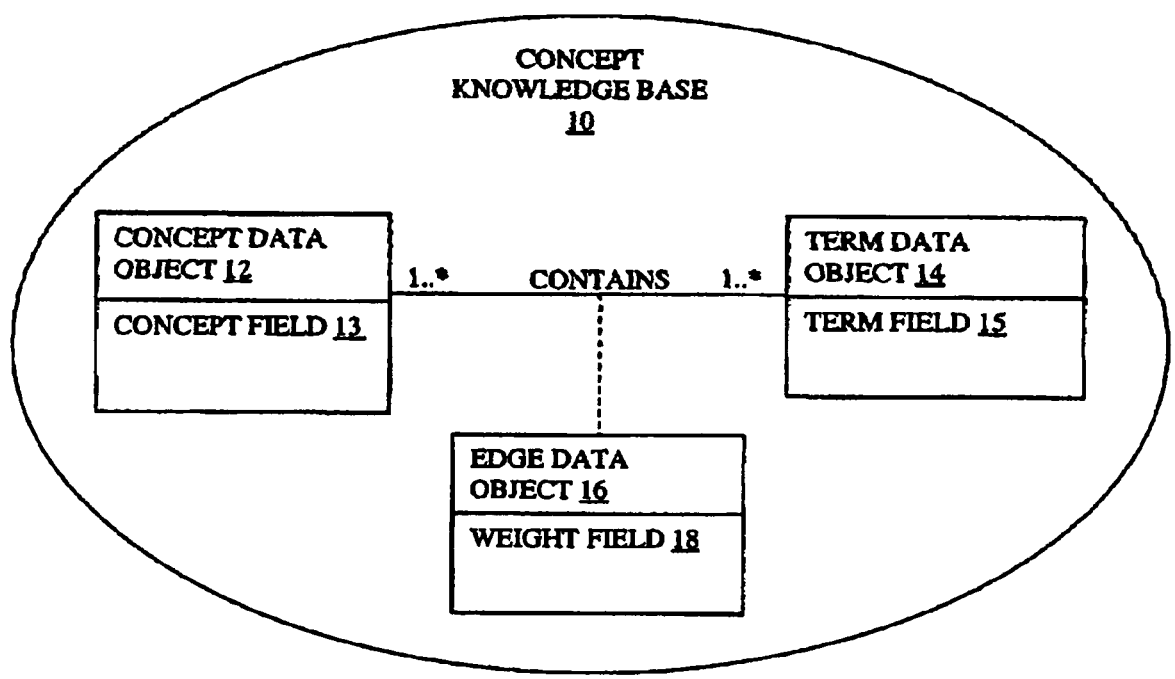
FIG. 3 is an architectural schematic of a data structure for a concept knowledge base in accordance with an aspect of the present invention.

FIG. 3 illustrates an architectural schematic of a data structure for a concept knowledge base 10, in accordance with an aspect of the present invention. The data structure is stored on a memory and is accessible by an application program being executed by a data processing system, such as the data processing system 1 illustrated in FIG. 1. The data structure contains information that is accessible by the application program.

The concept knowledge base 10 contains information relating to a field of knowledge. For example, the concept knowledge base 10 could contain information related to the field of science. The concept knowledge base 10 contains a number of concept data objects 12, a number of term data objects 14 and a number of edge data objects 16.

Each concept data object 12 contains a concept field 13 containing a concept that is related to a specific concept falling within the field of knowledge of the concept knowledge base 10. The concept field 13 typically contains a text string identifying the concept. For example, if the concept knowledge base 10 is for computer science, there may be concept data objects 12 with the concept field 13 containing the text string of "computer graphics", another concept data object 12 with the concept field 13 containing the text string of "distributed computing", another concept data object 12 with the concept field 13 containing the text string "artificial intelligence", etc.

Each term data object 14 contains a term field 15 containing a text string. The text string contains a word or phrase that describes a concept of one of the concept data objects 12.

Each concept data object 12 is associated with one or more term data objects 14 and each term data object 14 is associated with one or more concept data objects 12. The association of a concept data object 12 and a term data object 14 is defined by an edge data object 16 which contains a weight field 18. A term data object 14 that is associated with a concept data object 12 contains a term in the term field 15 that describes the concept contained in the concept field 13 of the concept data object 12. The relevancy of the term in the term field 15 of the term data object 14 to the concept in the concept field 13 of an associated concept data object 12 is represented by a weight in the weight field 18 of the edge data object 16.

Figure 4:
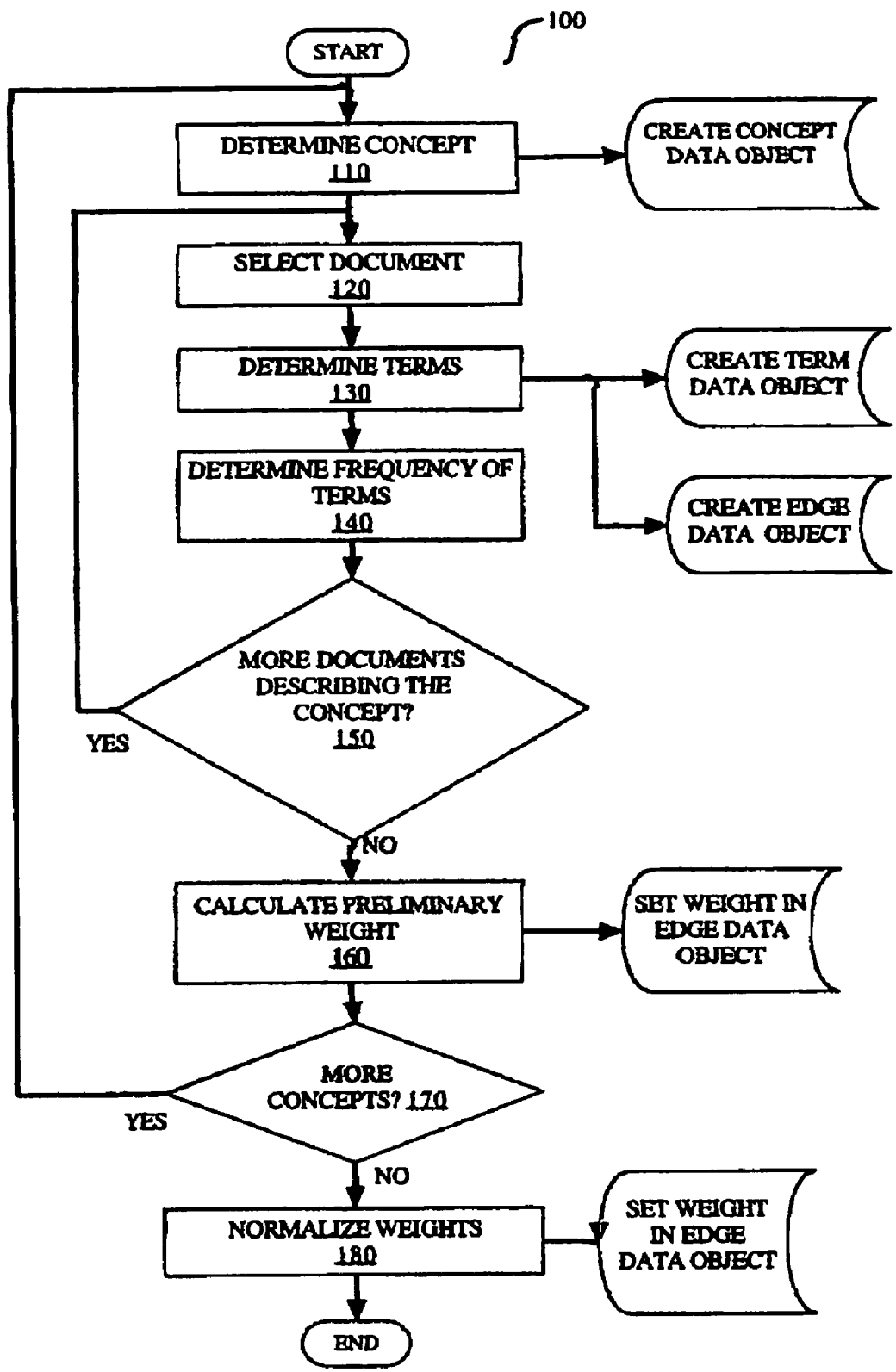
FIG. 4 illustrates a flowchart of a method of automatically creating a data structure containing a concept knowledge base in accordance with the present invention.

While it is possible to manually construct the data structure containing the concept knowledge base 10, FIG. 4 illustrates a flowchart of a method of automatically creating a data structure containing a concept knowledge base in accordance with the present invention.

Method 100 comprises the steps of determining a concept 110; selecting a document describing the concept 120; determining terms in the document to be analyzed 130; determining the frequency of the selected terms 140; checking if there are any remaining documents describing a concept 150; calculating a preliminary weight 160; checking if there are any more concepts 170; and normalizing all of the weights 180.

The method takes a number of documents and/or descriptions in computer readable form that describe a number of different concepts in a knowledge area and uses the documents to automatically generate a data structure of a concept knowledge base 10, as shown in FIG. 3.

The method 100 begins with step 110. A concept falling within the concept knowledge base is determined and a concept data object is created with information identifying the concept contained in the concept field.

Each concept will be described by one or more documents or descriptions in computer readable format. Once a concept has been determined at step 110, one or more documents describing the concept are identified and at step 120 one of these documents is selected to be analyzed.

At step 130, the method 100 determines the terms to be analyzed in the document. For each term to be analyzed, method 100 creates a term data object for each selected term with the term field containing the term, if a term data object containing the term does not already exist. An edge data object indicating the association of the term data object and the concept data object is also created and after the method 100 is completed will contain a weight indicating the relation of the term data object with the associated concept data object containing the concept described by the document being analyzed.

The terms that are analyzed can include all of the words used in the document or only specific words in the documents. For example, common words that are basically non-descriptive, such as "the", "a", "this", etc. may be excluded from the selected terms that are selected for analysis at step 130.

At step 140 the frequency of each of the selected terms in the selected document is to determined. The occurrence of each selected term in the document is determined. The occurrence of a selected term $t_j$ in the document being analyzed can easily be determined, via text matching, and is defined by the function:

$$f(d_{jk}, t_l)$$

Each of the terms appearing in the document are then averaged based on the number of occurrences of all of the terms in the document. For example, the averaging could be done using the following equation:

$$f^*(d_{ik}, t_l) = \frac{f(d_{ik}, t_j)}{\sum_{l=1}^{m} f(d_{ik}, t_{l,ik})}$$

where $d_{ik}$ is the document being analyzed for the set of terms $t_{ik}=(t_{l,ik}, \ldots, t_{m,ik})$ with m being the number of terms in document $d_{ik}$. This equation simply divides the frequency or tally of a term being analyzed by the total number of terms being analyzed in document $d_{ik}$. By conducting this averaging, the eventual weight determined for each association between a term node and a concept node takes into account the number of occurrences of a term in the document and provides a potentially more relevant indicator of the relation between the term data object to the concept data object because words or terms that appear often relative to the total number of terms will be given more weight. This preliminary averaging is used to try to prevent a single large document describing a concept from providing term weights that overshadow the weights provided by a number of smaller documents.

Next, at step 150, the method 100 checks to see if there are any more documents related to the concept that have not been analyzed. If there are more documents to be analyzed related to the concept, the method 100 returns to step 120, selects the next unanalyzed document and repeats steps 130, 140 and 150. As tong as more documents related to the concept exist; step 150, causes the method 100 to analyze all of the documents. When there are no more documents related to the concept to be analyzed, the method 100 continues on to step 160.

At step 160 the method 100 calculates a preliminary weight for each of the terms used in the documents related to a single concept. For each term an interim weight we is calculated taking into account the average teen frequency of the documents related to the concept.

$$w_{ij}^* = \frac{\sum_{k=1}^{n} f*(d_{ik}, t_j)}{n}$$

Wherein there are 1 . . . n documents.
This equation, in its entirety, is as follows:

$$w_{ij}^* = \frac{\sum_{k=1}^{n} \frac{f(d_{ik}, t_j)}{\sum_{l=1}^{m} f(d_{ik}, t_{l,ik})}}{n}$$

This calculation is used to prevent concepts with a large numbers of documents from producing term weights that overshadow term weights from concepts with fewer documents describing the concept.

At step 170, the method 100 checks to see if there are any more concepts left to be evaluated. If there are concepts remaining that have not been analyzed, the method 100 returns to step 110 and the next concept is selected to be analyzed. The method 100 then repeats steps 120, 130, 140, 150 and 160 determining a preliminary weight for each of the terms appearing in the documents describing the selected document. The method 100 continues to analyze each concept repeating steps 110, 120, 130, 140, 150, 160 and 170 until all of the concepts have been analyzed, at which point, the method 100 continues on to step 180.

At step 180 the method 100 determines a normalized weight for each of the terms associated with the concepts. The preliminary weight $w_{ij}^*$ previously determined for each association between a term $t_i$ and a concept is divided by the sum of all of the weights determined for the term $t_i$ connected to r concepts. This equation is shown as follows:

$$w_{ij} = \frac{w_{ij}^*}{\sum_{k=1}^{r} w_{if}^*(k)}$$

Wherein the index $f(k)$ is given by $f(x)$, $x=1 \ldots r$, representing the r concepts to which term i is connected to in the concept knowledge base.

The normalization of the weights is used to prevent common terms that are included in many of the documents for many concepts from having higher weight values than other less common terms. These terms are often of little value in describing a concept. By using normalization, the weights of common terms are significantly reduced. Without this normalization step, common terms that are included in many documents for many different concepts would have a very high weight, even though these terms are of little value in describing the concept. With this normalization step, the weights of these common terms are significantly reduced.

Additionally, rather than using the terms exactly as they appear in the documents or descriptions, in a further aspect of the invention, the stems of the roots of the terms are used to construct the knowledge base allowing terms to be matched based on their stems or toots rather than being based on exact text matches.

Additionally, in some circumstances it may not be necessary to analyze every term in a document. In a further aspect, the method 100 will focus on only specific terms in a document that are highlighted in a particular way, i.e. in an abstract. Alternatively, there could be a list of terms that are not analyzed, such as common terms that are not descriptive of a concept, for example terms such as the, and, etc. may be excluded from being selected.

At the conclusion of the method 100 a concept knowledge base as illustrated in FIG. 3 will have been automatically constructed by the method 100.

Overview of System

Figure 5:
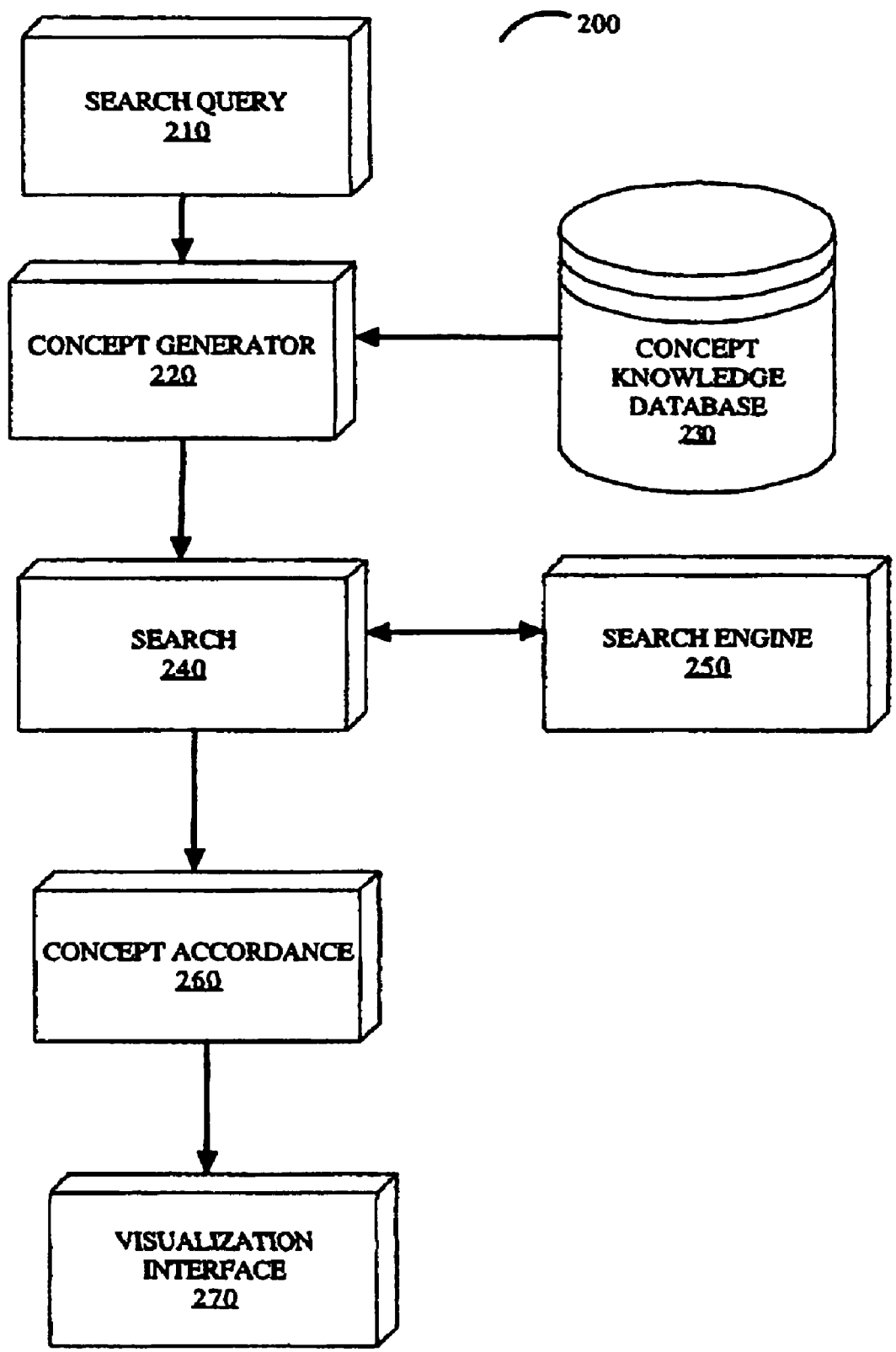
FIG. 5 is a schematic diagram of an overview of a software system in accordance with an aspect of the present invention.

FIG. 5 illustrates a software system in accordance with the present invention. The software system 200 contains: a search query module 210; a concept generator module 220; a concept knowledge database 230; a search module 240; a search engine module 250; a concept accordance module 260; and a visualization interface module 270.

A search query is input to the system 200 at the search query module 210. The search query contains one or more search terms and usually at least two or three search terms.

From the search query module 210 this search query containing one or more search terms is passed to the concept generator module 220, which uses the concept knowledge database 230 to select a set of concepts and generate a concept vector for each selected concept.

The search terms and the concept vectors are passed from the concept generator module 220 to the search module 240 where the search module 240 requests a search from the search engine 250 using the search query and receives search results. Typically, the results returned by the search engine module 250 are a list of returned documents, where to each returned document is typically a document surrogate that describes the actual documents located by the search engine module 250.

As the search results are received from the search engine module 250, the search engine module 250 passes the returned document to the concept accordance module 260 where a document vector is determined for each of the returned document and an accordance value indicating the similarity of the returned document to each of the concepts in the concept set is formulated. A fuzzy membership score is typically determined for the returned document relative to each of the concepts in the concept set and is used for the accordance value.

The search module 240 can wait until all the search results are returned from the search engine module 250 before passing the search results all together to the concept accordance module 260, however, in one embodiment, the search module 240 passes each returned document of the search results to the concept accordance module 260 as the search module 250 receives the returned document to decrease the time required by the system 200 to display the search results.

Finally, the concept set and the search results (comprising a plurality of returned document), with each returned document having an accordance value indicating the similarity of the returned document to each of the concepts in the concept set, are passed to the visualization interface module 270 wherein the visualization interface module 270 displays the search results to a user.

The software system 200 can be implemented wholly on a data processing system, such as the data processing system 1 shown in FIG. 2A, with only the search engine module 250 resident on a server 50 connected to the data processing system 1 over the network 55. Alternatively, various components of the software system 100, such as the search query module 210 could be resident on a mobile device 60 operably connected to a data processing system 1 which contains other components of the software system 200, (such as the concept generator 220, search module 240, etc.) as shown in FIG. 23.

Obtaining the Concepts

The software system 200 begins with an initial search query being input to the search query module 210 which passes the search query to the concept generator module 220. The concept generator module 220 accesses the concept knowledge database 230 and uses the information in the concept knowledge database 230 to generate a concept set and a respective set of concept vectors using the search query.

Figure 6:
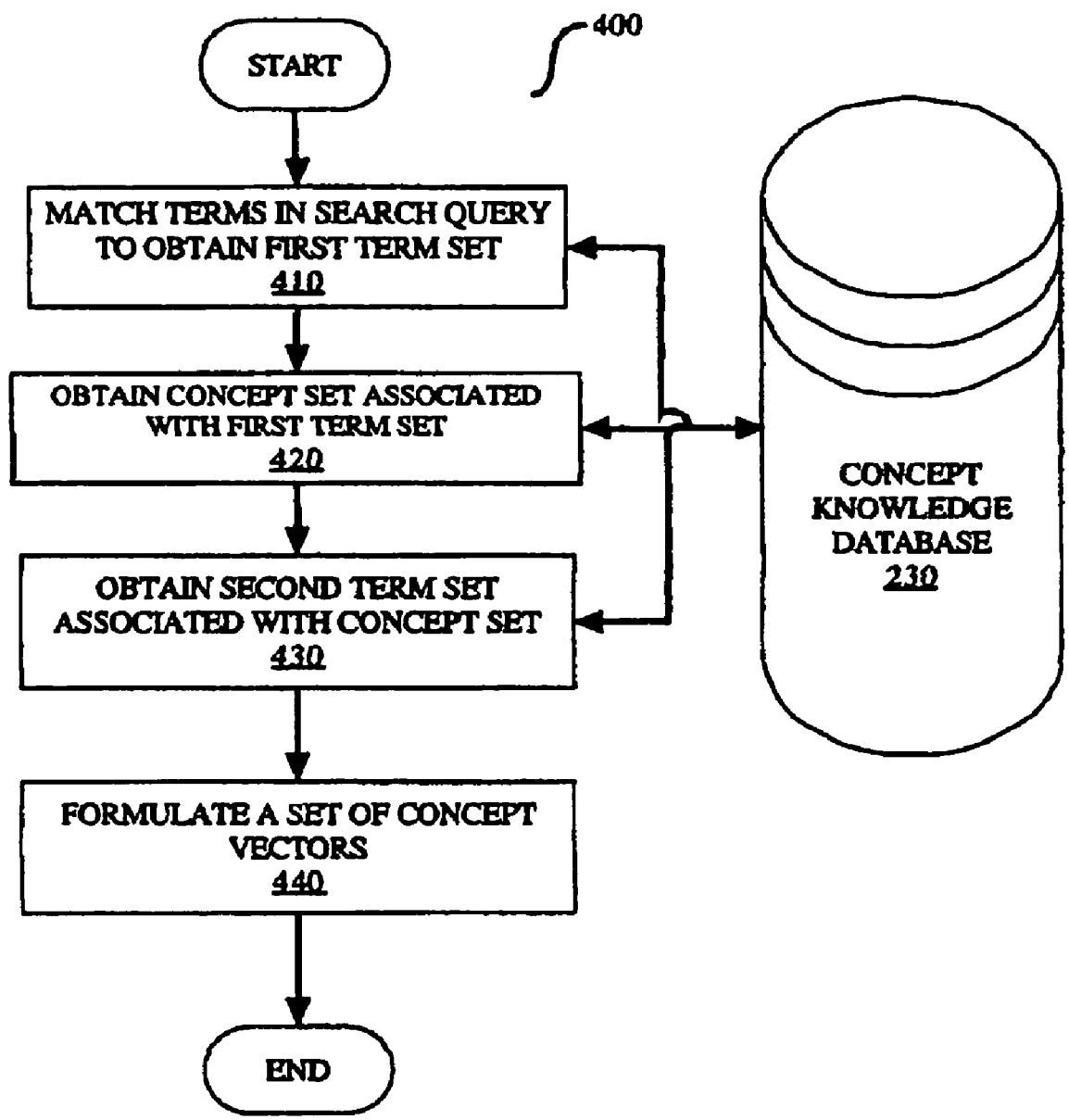
FIG. 6 illustrates a flowchart of a method for generating a set of concepts based on the search terms in the search query in accordance with an aspect of a present invention.

FIG. 6 illustrates a flowchart of a method 400 for generating a set of concepts based on the search terms in the search query. Method 400 is implemented by the concept generator module 220 in FIG. 4, using the concept knowledge database 230. When a search query is passed to the concept generator module 220, the method 400 uses the concept knowledge database 230 to generate a list of concepts using relationships between the search terms and concepts.

Method 400 comprises the steps of: matching terms in the search query to term data objects in the concept knowledge base to obtain a first term set 410; obtaining a concept set of concept data objects associated with the first term set 420; obtaining a second term set of term data objects associated with the concepts objects in the concept set 430; and formulating a set of concept vectors 440.

The method 400 begins with step 410 and matching the terms in the search query to term data objects in the concept knowledge database 230. The concept knowledge database 230 is accessed and the terms making up the search query are matched with any term data objects that have a term in the term field matching the term in the search query. A first term set containing these selected term data objects is obtained. After step 410 is completed, all of the term data objects in the concept knowledge database 230 that have a term in the term field that corresponds to one of the terms in the search query are identified and these term data objects have been added to a first term set.

At step 420, the first term set is used to obtain a concept set containing concept data objects from the concept knowledge database 230 associated with one or more term data objects in the first term set. The term data objects making up the first term set are used to obtain a number of concept data objects from the concept knowledge database 230. Concept data objects associated with one or more term data objects in the first term set are selected to form the concept set.

Concept data objects that are not strongly associated with term data objects in the first term set can be excluded from the concept set using a first weight threshold and a term ratio threshold. The first weight threshold is used to exclude concept data objects that are not strongly associated with one of the term data objects in the first term set by comparing the weight assigned to an association between a concept data object and a term data object and excluding the concept data object from the concept set if the weight determined for the association is less than the first weight threshold. By using this first weight threshold, the concept set is limited to only the more relevant concepts. Additionally, a term ratio threshold is used to further exclude concept data objects from the concept set. If a concept data object is associated with one of the term data objects in the first term set with a weight greater than the first weight threshold, the concept data object is evaluated to determine the ratio of all of the term data objects in the first term set to which the concept data object is associated with a weight greater than the first weight threshold. If this ratio is less than the term ratio threshold, the concept data object is excluded from the concept set.

Through experiments, the first weight threshold, term ratio threshold and second weight threshold can be determined. For example, some initial studies found that a first weight threshold of 0.05, a term ratio threshold of 0.26 and a second weight threshold of 0.10 provided satisfactory results.

At step 430 a second term set is obtained for each of the concept data objects in the concept set. Each of the concept data objects in the concept set are evaluated to determine term data objects, in the concept knowledge database 230, associated with each of these concept data objects. Term data objects associated with the concept data objects selected for the concept set are added to the second term set. A second weight threshold may be used to exclude term data objects from the second term set if they are associated with concept data objects in the concept sets by a weight that is less than the second weight threshold.

At step 440, the concept set is used to formulate a set of concept vectors. For each concept represented by a concept data object in the concept set, a concept vector is created using the first term set and second term set obtained for the concept data object at step 430. Each term data object in the first term set and second term set for a concept data object is defined as a dimension of the concept vector and the weight of the association between the term data object and the concept data object is used to set the magnitude of the concept vector in that assigned dimension.

At this point, the method 400 ends and a set of concepts and their corresponding concept vectors C={c1, c2, ..., cm} have been determined.

Referring again to FIG. 5, from the concept accordance module 260, the concept set and the respective concept vectors are passed to the search module 240 to request a search using the search query.

Search Module

When the search module 240 receives the search query, the concept set and the set of concept vectors, the search module 240 requests the search engine module 250 to conduct a search using the search query. The search module 240 is typically resident on the data processing system 1 and the search engine module 250 is typically a web search engine, such as the web search engine running on servers 50 in FIGS. 2A and 2B, with the search being conducted on a number of computer readable documents, such as searching for web pages on the World Wide Web. However, the search engine module 240 could be used in any computerized document storage system capable of searching a large number of computer readable documents.

The search engine module 240, could return the results of the search in the form of a list of complete documents located in the search, however, due to the likelihood that a relatively large number of documents can be located with the search and to save overhead on the data processing system, the search results are typically returned in the form of list of document surrogates, with a document surrogate returned for each document located in the search.

Figure 7:
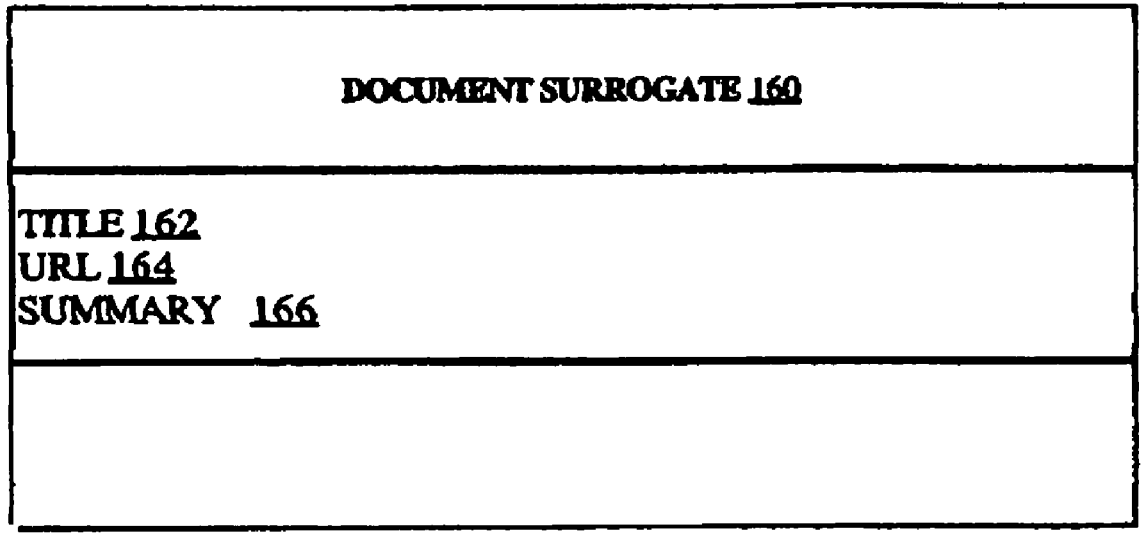
FIG. 7 is a typical document surrogate data object, which is commonly provided as a returned document by a search engine as one of a set of search results.

FIG. 7 illustrates a typical document surrogate data object 160 which is commonly provided as a returned document by a search engine as one of a set of search results. Rather than a search engine returning each complete document that is located in a search, search engines typically provide a set of document surrogates 160 in place of supplying the completed documents. Document surrogates 160 are the primary data objects in the list-based representation used by search engines. Each document surrogate 160 provides information describing the corresponding complete document which commonly consists of a title 162; a URL 164; a summary 166; and any other additional other assorted information. The title 162 provides the title of the corresponding complete document is described by the document surrogate 160, the URL 164 provides the address of the complete document and the summary 166 contains a short description or snippet of the complete document and usually provides the query terms of the search term in context.

Referring again to FIG. 5, the search results obtained by the search module 240 are passed to the concept accordance module 260 where accordance values for each return document indicating the degree of similarity between the returned document and the concepts in the concept set are formulated.

Concept Accordance

Figure 8:
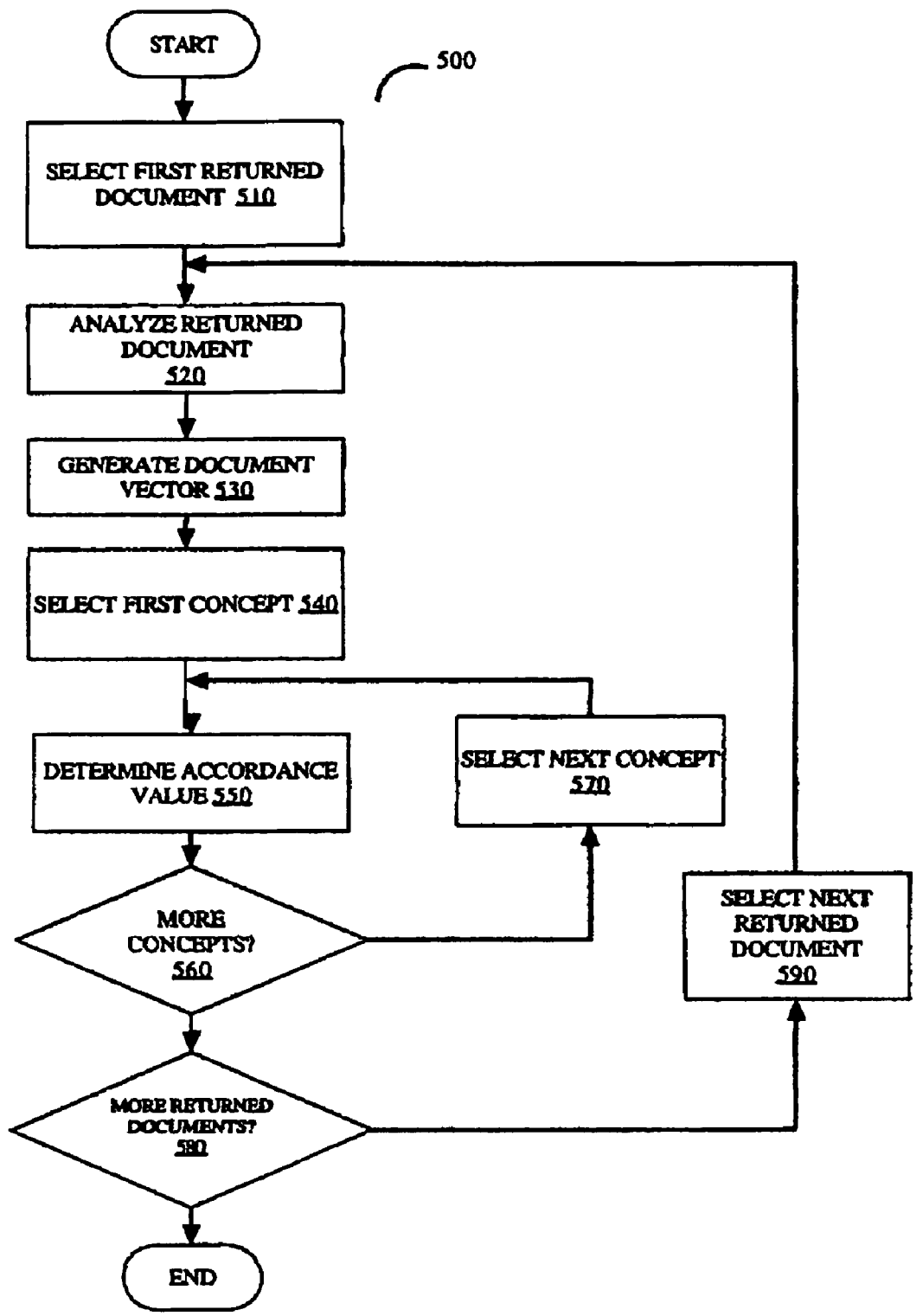
FIG. 8 is a flowchart of a method of determining accordance values for each returned document in a set of search results.

FIG. 8 illustrates a method 500 of determining accordance values for each returned document of the search results. Each returned document has an accordance value determined for each concept in the concept set and indicating the degree of similarity between the returned document and the concept. The accordance value is typically based on a fuzzy membership score with each concept in the concept set treated as a centroid to determine the clustering of the returned documents around the concepts. A returned document might have a higher fuzzy membership score in relation to one concept as compared to another concept, indicating that the first concept has a higher degree of similarity to the returned document than the second concept.

Method 500 comprises the steps of: selecting a first returned document 510; analyzing the returned document 520; generating a document vector 530 for the selected returned document; selecting a first concept 540; determining an accordance value for the selected returned document in relation to a selected concept 550; checking if more concepts remain in the concept set to be analyzed 560 in relation to the selected returned document and selecting the next concept 570, if more concepts remain in the concept set; once the selected returned document has been analyzed in relation to all the concepts in the concept set, checking if more returned documents are present 580 and selecting the next to returned document 590, if there are more returned documents; and ending when all the returned documents have an accordance indicator determined for each of the concepts in the concept set.

The method 500 begins with the selection of a first returned document at step 510. As the search results are returned, the method 500 selects one of the returned documents returned as the search results.

Next at step 520, the returned document is analyzed to determine a frequency of each unique word or term in the returned document. If the returned document is the entire document, the occurrence of each unique term in the entire document is determined. If the returned document is a document surrogate the occurrence of each unique term can be determined based on the summary of the complete document and optionally in the title.

In some cases it may be preferable to use the roots of the words rather than the words themselves, such as using Porter's stemming algorithm, so words with various prefixes and suffixes are not counted as separate terms. Each unique term in a returned document will be based on the root or stem of the term so that the frequencies determined are not reduced by the use of terms that use different suffixes, prefixes, etc. Matching based on the stems or roots of the search terms can be more effective than exact word matches, since it takes into account different variations of the same root word.

The frequencies determined for the unique terms in the selected returned document are then used to generate a document vector at step 530. The document vector represents the frequency of unique terms in the returned document in a multi-dimensional vector form. Each unique term is used to define a dimension of the document vector and the magnitude of the document vector in that dimension is then set as the frequency of the term in the returned document.

A first one of the concepts in the concept set is selected at step 540 and an accordance value indicating the degree of similarity between the returned document and the selected concept is determined at step 550. The accordance value is assigned by determining a fuzzy membership score of the returned document relative to the selected concept. Given the concept set, the corresponding concept vector set, C={$c_1$, $c_2$, ..., $c_m$}, and the document vector $d_i$ determined for the returned document determined at step 530, the fuzzy membership score, $u_{i,j}$, of the returned document can be determined with respect to a concept $c_j$ by the following equation:

$$u_{i,j} = \frac{1}{\sum_{k=1}^{m}\left(\frac{sim(d_i, c_j)}{sim(d_i, c_k)}\right)^2}$$

Where $sim(d_i, c_j)$ or the similarity between a document vector and a concept vector is given by the Euclidean distance metric:

$$sim(x_i, x_j) = (\Sigma_{k=1}^{P}(x_{i,k} - x_{j,k})^2)^{1/2}$$

where $x_i$ is the document vector and $x_j$ is the concept vector,

Although a specific clustering algorithm is provided a person skilled in the art will appreciate that other clustering algorithms could also be used.

The method 500 then checks, at step 560, to see if more concepts remain in the concept set and if more concepts remain, the next concept in the concept set is selected at step 570 and an accordance value consisting of a fuzzy membership score for the newly selected concept is determined at step 550. The method 500 will continue to repeat steps 550, 560 and 570 until all the concepts in the concept set of been selected and an accordance value determined for each of the returned document has been established for each of the to concepts in the concept set.

At step 580, if more returned documents are remaining, the next returned document is selected at step 590 and steps 520, 530, 540, 550, 560, 570, 580 and 590 are repeated until all of the repeated documents have been returned.

In this manner, the method 500 determines a document vector for each of the returned documents and uses the document vector to determine a fuzzy membership score for the returned document and each concept in the concept set, which is used then to assign an accordance value indicating the similarity between the returned document and each of the concepts in the concept set.

In one embodiment of the present invention, each returned document in a set of search results is evaluated as the returned document is returned from the search engine module 250 to decrease the amount of time the system requires before displaying the search results to a user.

At the end of the method 500 each of the returned documents will have an accordance value determined in relation to each of the concepts in the concept set.

From the concept accordance module 260, the search results comprising the plurality of returned documents and the formulated accordance values are passed to the visualization interface module 270.

Visualization Interface

The visualization interface module 270 displays the search results in a manner that allows a user to quickly determine the degree of similarity between one or more concepts in a concept set and a returned document. Additionally, the search results are displayed in such a way that a user can determine whether a first returned document is more or less similar to one or more selected concepts than a second returned document. Referring to FIG. 5, the search results in the form of a list of returned documents (with the accordance values determined for each returned document) and the concept set are passed, from the concept accordance module 260, to the visualization interface module 270 where the search results are displayed to a user.

Figure 9:
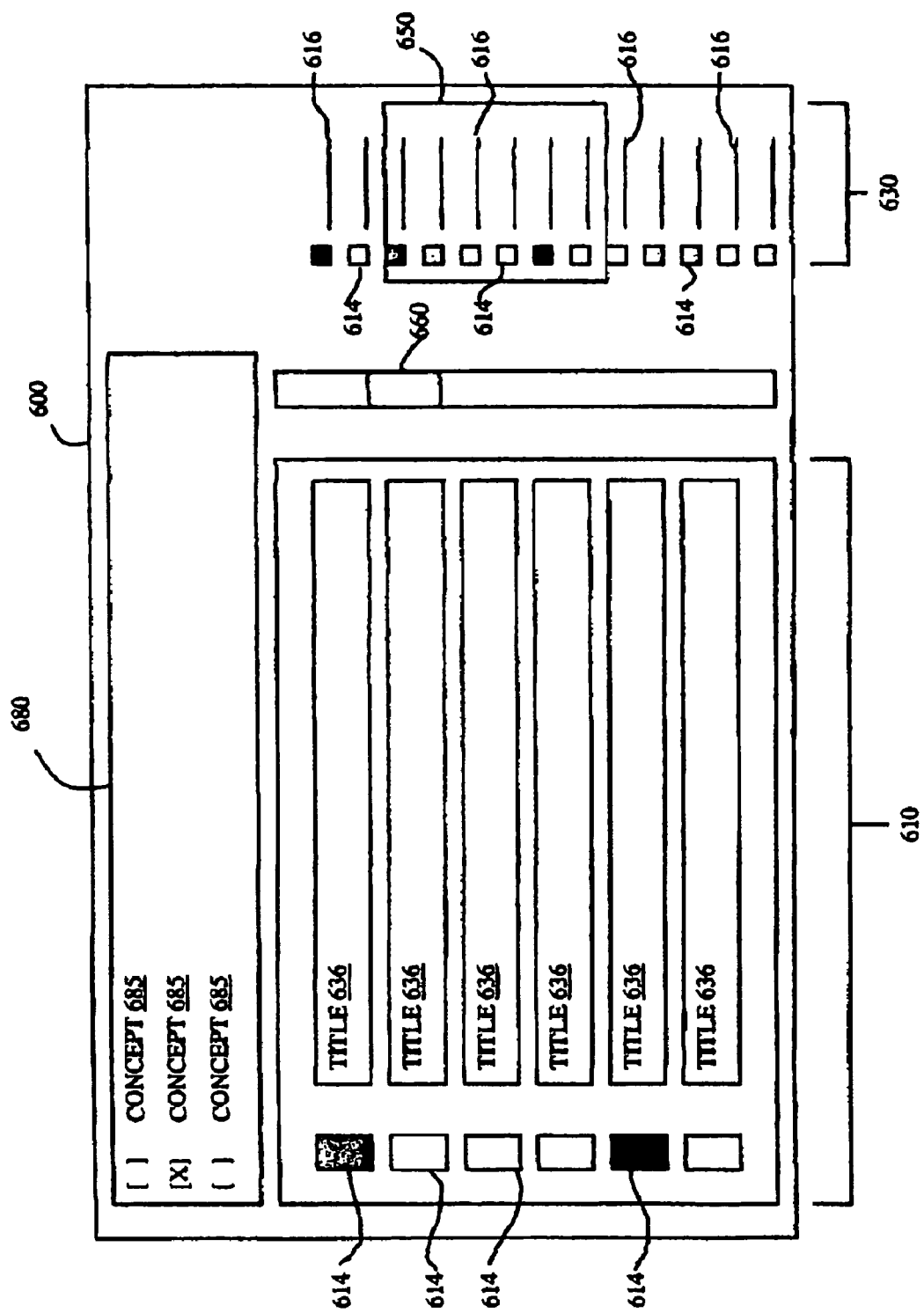
FIG. 9 is an embodiment of a graphical interface displaying a number of returned documents with accordance indicators.

FIG. 9 illustrates a screen shot of an embodiment of a graphical interface 600 that may be generated by the visual interface module 270 shown in FIG. 5, for displaying the search results. A compressed level of detail provides the user with a large overview of a large number of the search results and a more detailed level of view provides more detailed information about a smaller number of the search results.

A first portion 610 of the list of returned documents is shown in the graphical interface 600. Typically, each returned document shown in the first portion 610 comprises an accordance indicator 614 and a title 636. The title 636 provides readable text showing the title of the returned document and is typically a hyperlink to the actual located document, such as the webpage located in a web search or the document in an to information retrieval system.

Each returned document in the first portion 610 can be displayed with the summary of the returned document. Alternatively, each returned document in the first portion 610 can display the summary of the returned document only when a user moves a cursor over the returned document in the first portion 610. When the user moves a cursor over the returned document in the first portion 610, a popup field (tool tip) can appear containing the summary of the returned document.

Each returned document in the first portion 610 is displayed with an accordance indicator 614. The accordance indicator 614 is based on the accordance values formulated for the returned documents and indicates the similarity between a returned document and one or more of the concepts in the concept set generated using the search terms in the search query.

The accordance values consisting of the fuzzy membership scores determined for each returned document in relation to the concepts in the concept set, using method 500, illustrated in FIG. 8, are used to formulate the accordance indicators 614. Each concept 685 in the set of concepts is displayed in a viewing pane 680. A user can select one or more of the concepts 685. If a user selects only a single concept 685, the accordance indicator 614 shows the accordance value of each returned document in relation to the selected concept. However, if the user selects more than one of the concepts 685 in the concept set, the accordance indicator 614 is the result of the addition of the accordance to values of each returned document in relation to all of the selected concepts.

Typically, a color shade is assigned to each accordance indictor 614 based on the accordance values of the selected concepts for each returned document. Typically, returned documents with higher accordance values for the selected concepts (more similarity between a selected concept and a returned document) are assigned a color shade that is more intense or deeper. For example, an accordance indicator 614 indicating a relatively low accordance may have a very pale yellow color, while an accordance indicator 614 indicating a higher accordance may be a color shade of a much darker red.

A second portion 630 of the list of returned documents is shown in the graphical interface 600. The first portion 610 is a subset of the returned documents shown in the second portion 630. The second portion 630 displays each returned document in a much smaller format so that the second portion 630 displays more of the returned documents than the first portion 610 however, the first portion 610 provides more information regarding each displayed returned documents than the returned documents displayed in the second portion 630.

Each of the returned documents in the second portion 630 is displayed in a format which provides a compressed or small view of the returned document. Each returned document shown in the second portion 630 is displayed with an accordance indicator 614, and, typically, a title representation 616.

The title representation 616 represents the title of the returned document; however, the title representation 616 does not necessarily have to provide the title in a readable format. Returned documents displayed in the second portion 630 may be displayed so small that a solid line is used to provide the title representation 616 and the title representation 616 merely indicates the approximate length of the title of the returned document in relation to the length of the titles of the other returned documents.

By displaying a more detailed first portion 610 of the list of returned documents and a less detailed second portion 630 of the list of returned documents, where the second portion 630 contains many more returned documents than the first portion 610 the interface 600 provides two levels of detail to a user about returned documents provided in the list returned as the search results.

Each of the returned documents displayed in the second portion 630 corresponds to a returned document displayed in the first portion 610, such that all of the returned documents in the first portion 610 are contained in the second portion 630, with the returned documents in the first portion 610 occurring in the same order that they occur in the second portion 630. The second portion 630 represents a subset of list of returned documents making up the search results from the search engine and the first portion 610 represents a subset of the returned documents show in the second portion 630. The first format allows a user to see a large number of the returned documents in a compressed view in the second portion 630 and then also see some of these returned shown in the second portion 630 in a larger, more detailed view in the first portion 610.

The accordance indicators 614 displayed with the returned documents in the first portion 610 indicates the same accordance values as the accordance indicators 614 associated with the same returned document in the second portion 630.

The second portion 630 displays a much greater portion of the list of returned documents than the first portion 610. In some cases, more than one hundred (100) returned documents may be displayed in the second portion 630. On the other hand the first portion 610 displays a relatively smaller number of the returned documents because the returned documents displayed in the first portion 610 provides more details and therefore the returned documents must be shown in a large enough size that a user can read the titles 636 of the returned documents shown in the first portion 610. For example, while the second portion 630 may display one hundred (100) returned documents in the first format the first portion 610 may display fewer than twenty five (25) returned documents.

While each of the accordance indicators 614 could be an assigned number such as a percentage, the use of a color shade as the accordance indicators 614 (or as part of the accordance indicators 614) allows the information to be conveyed to the user even though the returned document in the second portion 630 may be displayed too small for a user to either easily read or even be able to read text. Using a color shade for the accordance indicators 614, the accordance indicators 614 do not have to be very large in order to convey the necessary information to a user; just large enough to convey to a user a shade of color. While numbers, text or geometric shapes cannot be illustrated using a single pixel; a color shade can be. In some cases, the accordance indicator 614 may be made as small as a single pixel of a display screen.

An indicator frame 650 is positioned over the returned documents in the second portion 630 that are also shown in the first portion 610. The indicator frame 650 indicates the returned documents shown in the second portion 630 that are also shown in the first portion 610.

When a user makes a selection that changes the returned documents shown in the first portion 610, such as by using a scroll bar 660 to scroll to a new set of returned documents displayed in the first portion 610, the second portion 630 is updated to indicate the same returned documents shown in the first portion 610 in the second portion 630, by moving the indicator frame 650 along the second portion 630.

In this manner, a user can quickly look over the accordance indicators 614 for each returned document shown in the first portion 610 to determine which returned documents correlate to the desired concepts. Additionally, using the second portion 630, a user can quickly look over the accordance indicators 614 for each returned document in the second portion 630 and quickly determine which returned documents shown in the second format 630 correlate to the desired concepts closer then the other returned documents without requiring the user to perform any in-depth analysis of each returned document. By simply scanning over the accordance indicators 614 a user can quickly and easily visually locate the accordance indicators 614 that indicate a returned document that has a high correlation with a concept by the various shades of color shown in the accordance indicators 614.

A user can also visually analyze the returned documents shown in the first portion 610, checking for returned documents that contain accordance indicators 614 indicating the similarity of a returned document to one or more of the concepts. Once a user identifies a returned document or a grouping of returned documents in the first portion 610 that the user wishes to examine in more detail, the user can then move the indicator frame 660 so that the selected returned documents or grouping of returned documents in the second portion 630 are displayed in the second format in the first portion 610. A user can then examine the titles 636 of the represented documents and click on a desired returned document title 636 to go to the document.

Figure 10:
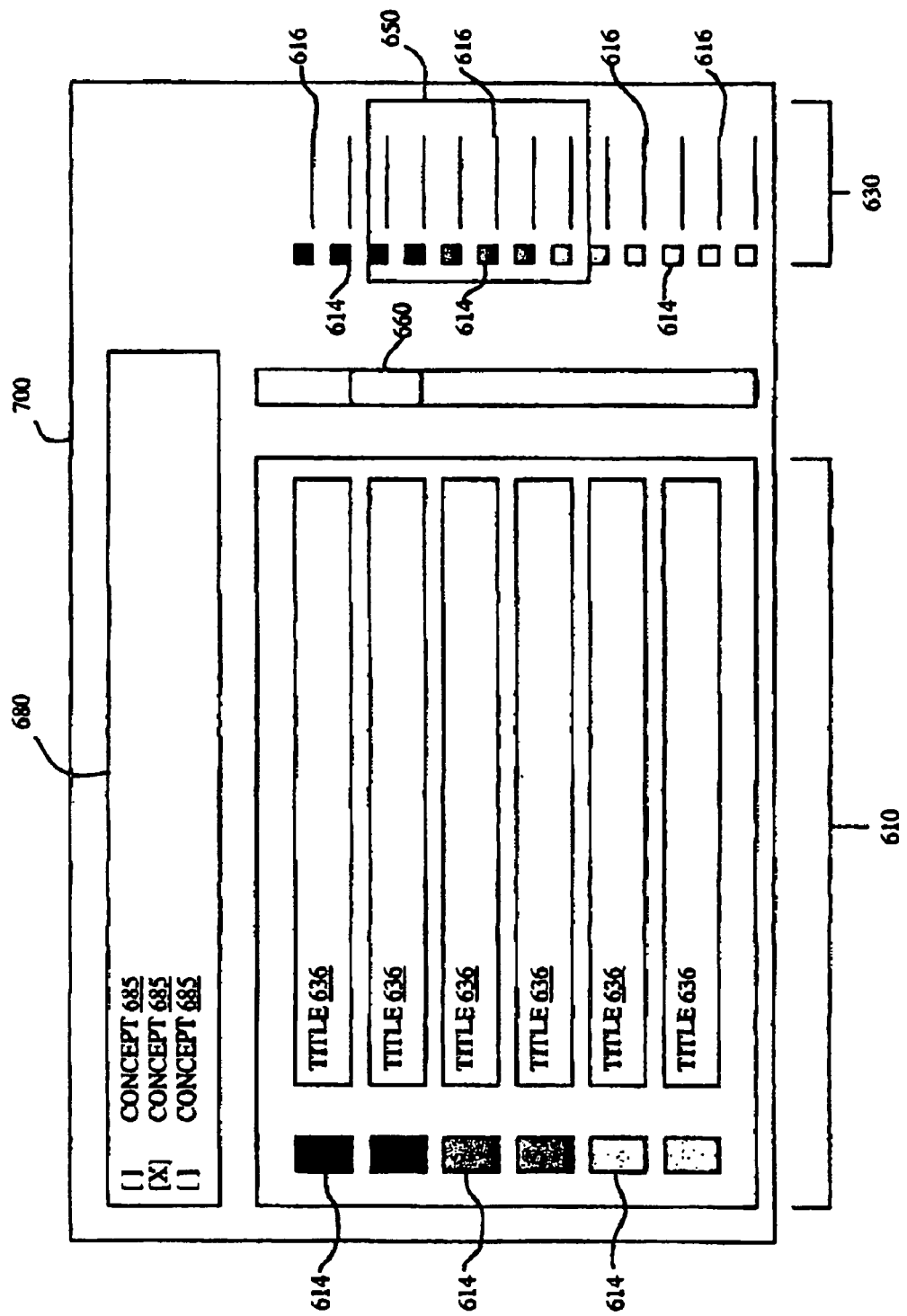
FIG. 10 is another embodiment of a graphical interface displaying a number of returned documents with accordance indicators and sorted by accordance values.

FIG. 10 illustrates a screen shot of a further embodiment of a graphical interface 700 that may be generated by the visual interface module 470 shown in FIG. 5, for displaying the search results wherein the accordance values of the returned documents in relation to the selected concept or concepts in the concept set are used to sort the returned documents in the first portion 610 and second portion 630. The returned documents are sorted based on the accordance values for the returned documents in relation to a selected concept. Returned documents that have a higher degree of similarity to a selected concept (shown with the accordance indicators 614) appear higher in the list than other returned documents that are less similar to the selected concept or concepts.

Figure 11:
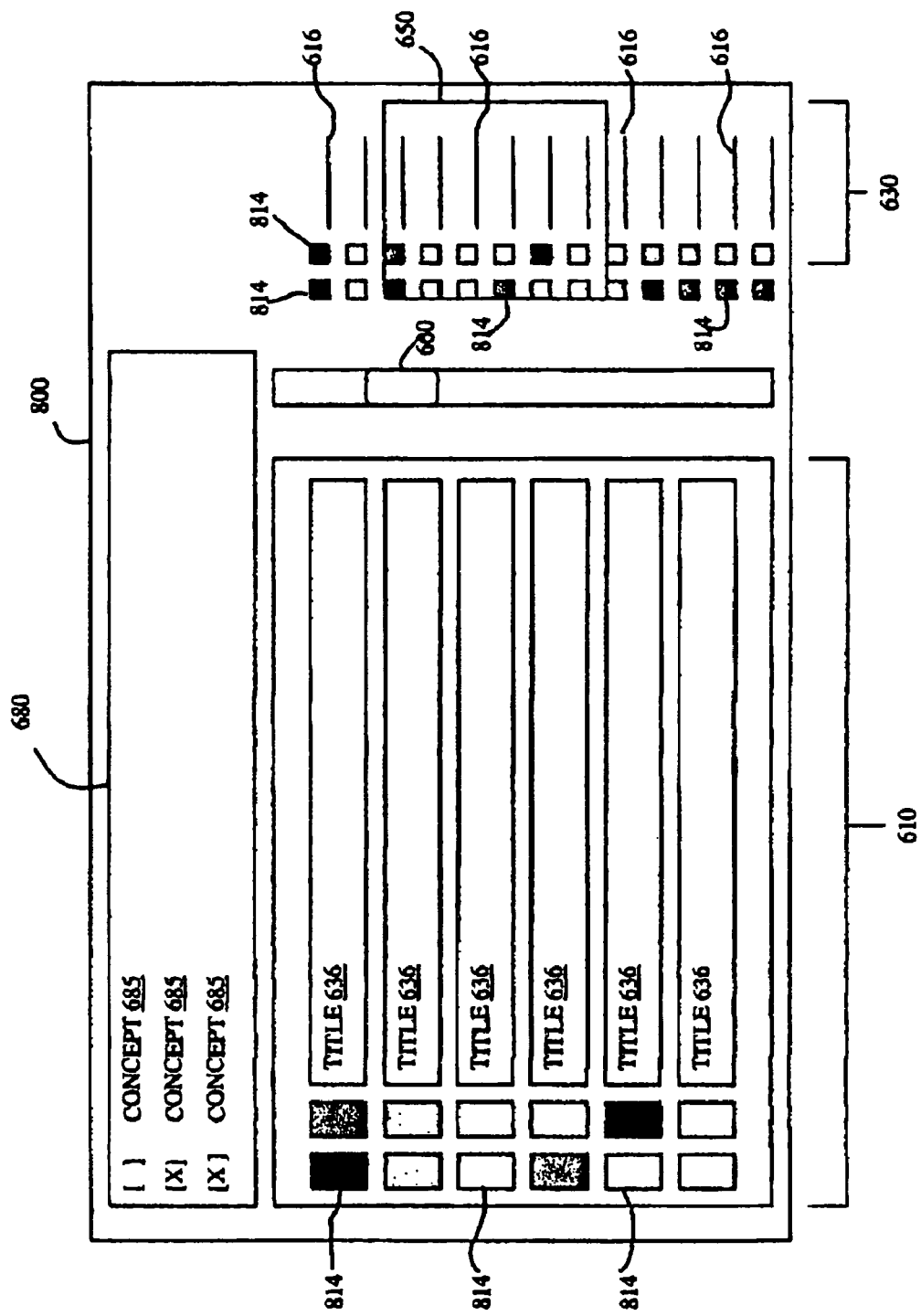
FIG. 11 is an embodiment of a graphical interface displaying a number of returned documents with a plurality of accordance indicators for each displayed returned document.

FIG. 11 illustrates a screen shot of a further embodiment of a graphical interface 800 that may be generated by the visual interface module 470 shown in FIG. 5, for displaying the search results. Graphical interface 800 is similar to graphical interface 600 (illustrated in FIG. 9) in that a first portion 610 of a list of returned documents is displayed with each returned document displaying the title 636 and any other information. However, instead of displaying a single accordance indicator 614 with each returned document wherein when more than one concept from the concept set is selected the single accordance indicator 614 is made up of the sums of the accordance values of the selected concepts, graphical interface 800 provides a separate accordance indicator 814 for each selected concept. Each accordance indicator 814 displays a single accordance value indicating the similarity between a returned document and a specific concept in the concept set. By simply viewing the accordance indicators 813 a user can see how similar each of the displayed returned documents are to a specific concept. In this manner a user can compare the similarity of a returned document to two or more of the concepts in a concept set.

A user can sort the list of the returned documents displayed in the graphical interface 800 based on one concept over the one or more others by selecting one of the concepts to sort the list by. In one embodiment, a user selects the concept the user desires the list to be to sorted by. The list of returned documents is then resorted to place a precedent on the selected concept and the first portion 610 of returned documents and the second portion 630 of the returned documents are updated to reflect the newly sorted list.

A user can also conduct a nested sort by selecting a second concept. The list of returned documents is then resorted to place a primary weight on returned documents with high accordance values with the first selected concept and then a secondary weight on returned documents with high accordance values with relation to the second selected concept. The first portion 60 of returned documents of and the second portion 60 of the returned documents are updated to reflect the newly sorted list.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A computer implemented method of displaying search results, the computer comprising at least one processor for executing computer readable instructions stored in a memory, the method comprising:

receiving at the computer a search query containing at least one of search term to conduct a search of a plurality of computer readable documents;

obtaining search results comprising a first document and second document based on the at least one search term of the search query;

determining at least one concept related to the search query by matching the at least one search term to the at least one concept in a concept knowledge base;

evaluating the similarity between the first and second documents and the at least one concept by determining an accordance value indicating a similarity between the first and second documents and the at least one concept by:

determining a first accordance value by evaluating the similarity between the first returned document and the at least one concept; and determining a second accordance value by evaluating the similarity between the second returned document and the at least one concept; and displaying the first returned document and second returned document sorted in an order based on the first accordance value and the second accordance value.

2. The method of claim 1 wherein determining the at least one concept related to the search query comprises:

accessing a concept knowledge base having a plurality of concept data objects and a plurality of term data objects associated with at least one of the plurality of concept data objects;

matching at least one of the at least one search term with at least one of the plurality of term data objects to generate a first term set containing term data objects from the concept knowledge base that match the at least one search term; and generating a concept set containing at least one concept data object associated with one or more of the term data objects in the first term set.

3. The method of claim 2 further comprising:

generating a concept vector for each concept data object in the concept set, the concept vector comprising a dimension for each term data object associated with the concept data object, a magnitude of the dimension based on a weight of the association of the term data object with the concept data object; and generating a document vector for the at least one returned document, the document vector comprising a dimension for each of a plurality of terms in the document, a magnitude of the dimension based on a frequency of occurrence of each of the plurality of terms;

wherein evaluating the similarity between the at least one returned document and the at least one concept is based on a fuzzy membership score determined by comparing the concept vector to the document vector.

4. The method of claim 3 further comprising allowing a user to select more than one concept from the concept set and having the accordance value based on the combined fuzzy membership scores determined for the at least one returned document and the selected concepts.

5. The method of claim 3 further comprising displaying at least two accordance values with the at least one returned document, each of the at least two accordance indicators corresponding to different concepts in the concept set.

6. The method of claim 1 wherein the accordance values are displayed as a color shade.

7. The method of claim 6 wherein the returned documents of the search results are ordered in a list and wherein the at least one returned document is displayed in a first portion of the list of returned documents and simultaneously displayed in a second portion of the list of returned documents on a display screen, and wherein the number of returned documents displayed in the second portion is greater than the number of returned documents displayed in the first portion.

8. The method of claim 7 wherein the returned documents are ordered in the list based on the similarity between the at least one returned document and the at least one concept.

9. The method of claim 3 wherein the returned document is a document surrogate.

10. The method of claim 1 wherein generating a document vector for the at least one returned document comprises:

generating a first document vector for the first returned document; and generating a second document vector for the second returned document.

11. The method of claim 10 further comprising displaying the first returned document with a first accordance indicator based on the first accordance value and the second returned document with a second accordance indicator based on the second accordance value.

12. The method of claim 11 further comprising displaying at least two accordance indicators with each of the first returned document and the second returned document, each of the at least two accordance indicators corresponding to different concepts in the concept set.

13. The method of claim 12 wherein the accordance indicators consist of a color shade.

14. The method of claim 10 wherein the search results comprise of list of returned documents containing the first returned document and second returned document and wherein the first returned document and second returned document are displayed in a first portion of the list of returned documents and simultaneously displayed in a second portion of the list of returned documents, and wherein the number of returned documents displayed in the second portion is greater than the number of returned documents displayed in the first portion.

15. The method of claim 1 wherein the first returned document and second returned document are document surrogates.

16. A data processing system for displaying search results comprising:
- at least one processor;
- a memory operatively coupled to the at least one processor;
- a display device operative to display data; and
- a program module stored in the memory and operative for providing instructions to the at least one processor, the at least one processor responsive to the instructions of the program module, the program module operative for:
- receiving a search query containing at least one search term to conduct a search of a plurality of computer readable documents;
- obtaining search results comprising a first returned document and a second returned document on the at least one search term of the search query;
- determining at least one concept related to the search query by matching the at least one search term to the at least one concept in a concept knowledge base;
- evaluating the similarity between a returned document and the at least one concept to determine an accordance value by determining a first accordance value by evaluating the similarity between the first returned document and the at least one concept and a second accordance value by evaluating the similarity between the second returned document and the at least one concept; and
- displaying the first returned document and second returned document sorted in an order based on the first accordance value and the second accordance value.

17. The system of claim 16 wherein determining the at least one concept related to the search query comprises:
- accessing a concept knowledge base having a plurality of concept data objects and a plurality of term data objects associated with at least one of the plurality of concept data objects;
- matching at least one of the at least one search term with at least one of the plurality of term data objects to generate a first term set containing term data objects from the concept knowledge base that match the at least one search term; and
- generating a concept set containing at least one concept data object associated with one or more of the term data objects in the first term set.

18. The system of claim 17 wherein the program module is further operative for:
- generating a concept vector for each concept data object in the concept set, the concept vector comprising a dimension for each term data object associated with the concept data object, a magnitude of the dimension based on a weight of the association of the term data object with the concept data object; and
- generating a document vector for the at least one returned document, the document vector comprising a dimension for each of a plurality of terms in the document, a magnitude of the dimension based on a frequency of occurrence of each of the plurality of terms;
- wherein evaluating the similarity between the at least one returned document and the at least one concept is based on a fuzzy membership score determined by comparing the concept vector to the document vector.

19. The system of claim 18 further comprising allowing a user to select more than one concept from the concept set and having the accordance value based on the combined the fuzzy membership scores determined for the at least one returned document and the selected concepts.

20. The system of claim 18 further comprising displaying at least two accordance values with the at least one returned document, each of the at least two accordance values corresponding to different concepts in the concept set.

21. The system of claim 18 wherein the returned documents of the search results are ordered in a list and wherein the at least one returned document is displayed in a first portion of the list of returned documents and simultaneously displayed in a second portion of the list of returned documents on a display screen, and wherein the member of returned documents displayed in the second portion is greater than the number of returned documents displayed in the first portion.

22. The system of claim 21 wherein the returned documents are ordered in the list based on the similarity between the at least one returned document and the at least one concept.

23. The system of claim 18 wherein the returned document is a document surrogate.

24. The system of claim 16 wherein the accordance value is displayed as a color shade.

25. The system of claim 16 wherein generating the document vector for the at least one returned document comprises:
- generating a first document vector for the first returned document; and
- generating a second document vector for the second returned document, and wherein the first accordance indicator is based on a fuzzy membership score determined by comparing the concept vector of the at least one concept to the first document vector and the second accordance indicator is based on a fuzzy membership score determined by comparing the concept vector of the at least one concept to the second document vector.

26. The system of claim 25 further comprising displaying the first returned document with a first accordance indicator based on the first accordance value and the second returned document with a second accordance indicator based on the second accordance value.

27. The system of claim 26 further comprising displaying at least two accordance values with the first returned document and the second returned document, each of the at least two accordance values corresponding to different concepts in the concept set.

28. The system of claim 26 wherein the first accordance indicator and second accordance indicator consist of a color shade.

29. The system of claim 25 wherein the search results comprise of list of returned documents containing the first returned document and the second returned document and wherein the first returned document and second returned document are displayed in a first portion of the list of returned documents and simultaneously displayed in a second portion of the list of returned documents, and wherein the number of returned documents displayed in the second portion is greater than the number of returned documents displayed in the first portion.

30. The system of claim 16 wherein the first returned document and second returned document are document surrogates.

* * * * *